(12) United States Patent
Lai et al.

(10) Patent No.: US 12,254,202 B2
(45) Date of Patent: Mar. 18, 2025

(54) CONTROL METHOD OF FLASH MEMORY CONTROLLER AND ASSOCIATED FLASH MEMORY CONTROLLER AND STORAGE DEVICE

(71) Applicant: Silicon Motion, Inc., Hsinchu County (TW)

(72) Inventors: Kun-Cheng Lai, Hsinchu County (TW); Yen-Yu Jou, Taoyuan (TW)

(73) Assignee: Silicon Motion, Inc., Hsinchu County (TW)

( * ) Notice: Subject to any disclaimer, the term of this patent is extended or adjusted under 35 U.S.C. 154(b) by 87 days.

(21) Appl. No.: 18/123,336

(22) Filed: Mar. 20, 2023

(65) Prior Publication Data

US 2024/0319897 A1  Sep. 26, 2024

(51) Int. Cl.
*G06F 3/06* (2006.01)

(52) U.S. Cl.
CPC ............ *G06F 3/064* (2013.01); *G06F 3/0604* (2013.01); *G06F 3/0629* (2013.01); *G06F 3/0679* (2013.01)

(58) Field of Classification Search
CPC ...... G06F 3/0604; G06F 3/0629; G06F 3/064; G06F 3/0679
See application file for complete search history.

(56) References Cited

U.S. PATENT DOCUMENTS

| | | | | |
|---|---|---|---|---|
| 11,340,986 | B1* | 5/2022 | Yadav | G06F 11/1048 |
| 2019/0347006 | A1* | 11/2019 | Yeh | G06F 3/064 |
| 2020/0089407 | A1* | 3/2020 | Baca | G06F 3/0635 |
| 2020/0167274 | A1 | 5/2020 | Bahirat | |
| 2021/0132827 | A1* | 5/2021 | Helmick | G06F 3/064 |
| 2021/0223962 | A1* | 7/2021 | Esaka | G06F 3/064 |
| 2021/0334022 | A1* | 10/2021 | Alrod | G06F 3/0652 |
| 2021/0334203 | A1* | 10/2021 | Helmick | G06F 12/1054 |
| 2023/0367500 | A1* | 11/2023 | Kragel | G06F 3/061 |

FOREIGN PATENT DOCUMENTS

| | | |
|---|---|---|
| CN | 115114059 A | 9/2022 |
| KR | 10-2022-0098894 A | 7/2022 |
| TW | 202240397 A | 10/2022 |

* cited by examiner

*Primary Examiner* — Aracelis Ruiz
(74) *Attorney, Agent, or Firm* — Winston Hsu (57) ABSTRACT

The present invention provides a control method of a flash memory controller, wherein the flash memory controller is configured to access a flash memory module, the flash memory module comprises a plurality of blocks, and the control method comprising: receiving a settling command from a host device; in response to the settling command, configuring at least one portion of the flash memory module as a zoned namespace, wherein the zoned namespace logically comprises a plurality of zones; generating parameter information according to a configuration of the zoned namespace; and transmitting the parameter information to the host device, for the host device uses the parameter information to set the zone.

15 Claims, 13 Drawing Sheets

CONTROL METHOD OF FLASH MEMORY CONTROLLER AND ASSOCIATED FLASH MEMORY CONTROLLER AND STORAGE DEVICE

BACKGROUND OF THE INVENTION

1. Field of the Invention

The present invention relates to a flash memory, and more particularly, to a flash memory controller and an associated control method.

2. Description of the Prior Art

In the Non-Volatile Memory express (NVMe) specification, a zoned namespace is standardized. However, since the above-mentioned zoned namespace and each zone within it are viewed purely from the perspective of a host device, how to propose an efficient memory management method to correctly and quickly perform appropriate processing is an important issue.

SUMMARY OF THE INVENTION

It is therefore an objective of the present invention to provide a flash memory controller capable of sending at least one configuration setting to a host device for the determination of zone size, to solve the above-mentioned problems.

According to one embodiment of the present invention, a control method of a flash memory controller is disclosed, wherein the flash memory controller is configured to access a flash memory module, the flash memory module comprises a plurality of blocks, and the control method comprising: receiving a settling command from a host device; in response to the settling command, configuring at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones; generating parameter information according to a configuration of the zoned namespace; and transmitting the parameter information to the host device, for the host device uses the parameter information to set the zone.

According to one embodiment of the present invention, a flash memory controller is disclosed, wherein the flash memory controller is configured to access a flash memory module, the flash memory module comprises a plurality of blocks, and the flash memory controller comprising a read only memory configured to store a code, and a microprocessor configured to execute the code for controlling access of the flash memory module. The microprocessor is configured to perform the steps of: receiving a settling command from a host device; in response to the settling command, configuring at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones; generating parameter information according to a configuration of the zoned namespace; and transmitting the parameter information to the host device, for the host device uses the parameter information to set the zone.

According to one embodiment of the present invention, a storage device comprising a flash memory module and a flash memory controller is disclosed. The flash memory module comprises a plurality of blocks, and the flash memory controller is configured to access the flash memory module. The flash memory controller is configured to perform the steps of: receiving a settling command from a host device; in response to the settling command, configuring at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones; generating parameter information according to a configuration of the zoned namespace; and transmitting the parameter information to the host device, for the host device uses the parameter information to set the zone.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
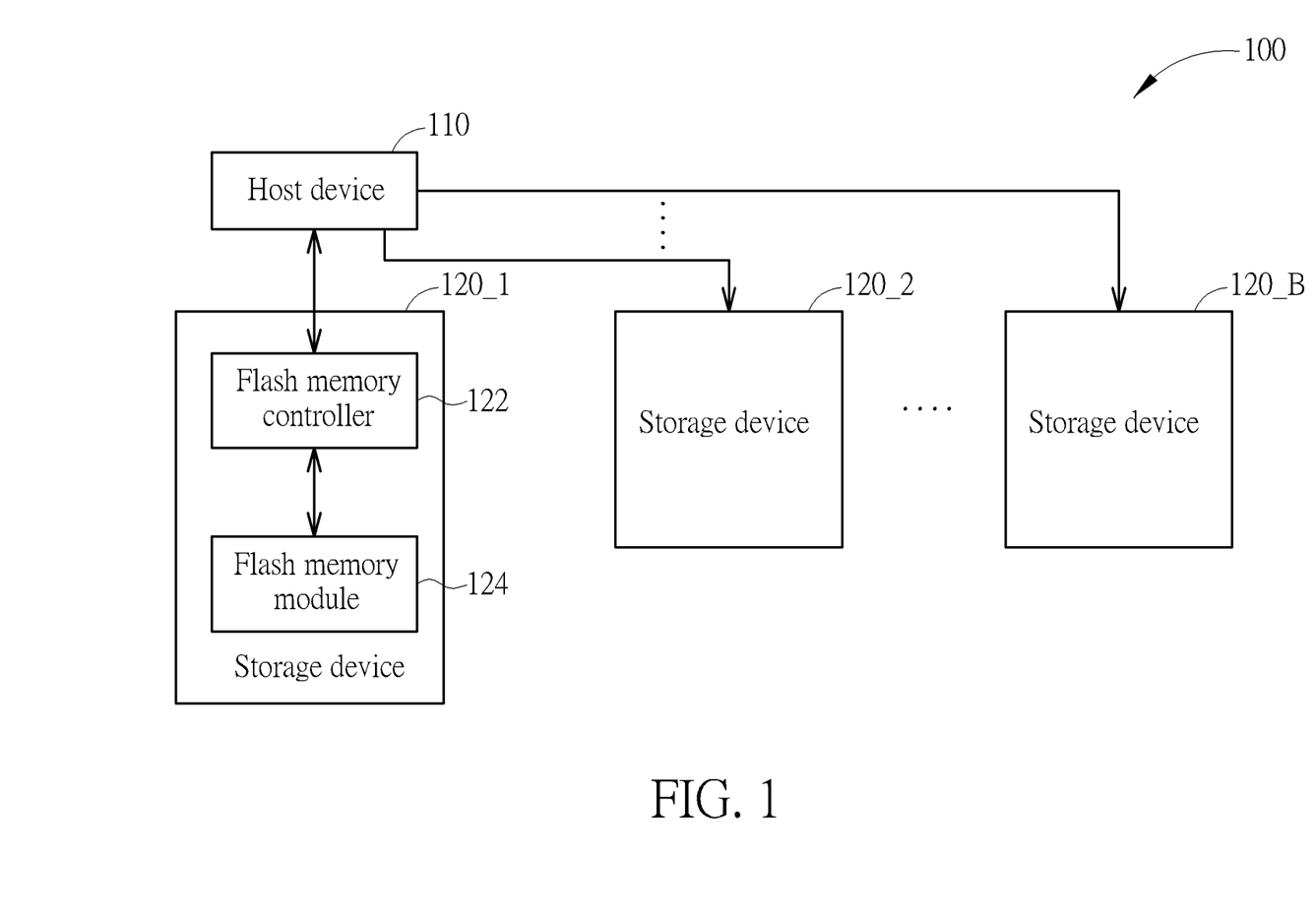
FIG. 1 is a diagram illustrating an electronic device according to an embodiment of the present invention.

FIG. 1 is a diagram illustrating an electronic device 100 according to an embodiment of the present invention. As shown in FIG. 1, the electronic device 100 comprises a host device 110 and a plurality of storage devices 120_1-120_B. Each storage device (e.g., storage device 120_1) includes a flash memory controller 122 and a flash memory module 124. In the present embodiment, each of the plurality of storage devices 120_1-120_B can be a SSD or any storage device having a flash memory module. The host device 110 can be a central processing unit or other electronic devices or components that can be used to access the storage devices 120_1-120_B. The electronic device 100 can be a server, a personal computer, a laptop computer or any portable electronic device. It should be noticed that although a plurality of storage devices 120_1-120_B are shown in FIG. 1, in some embodiments, the electronic device 100 may have a single storage device 120_1.

Figure 2:
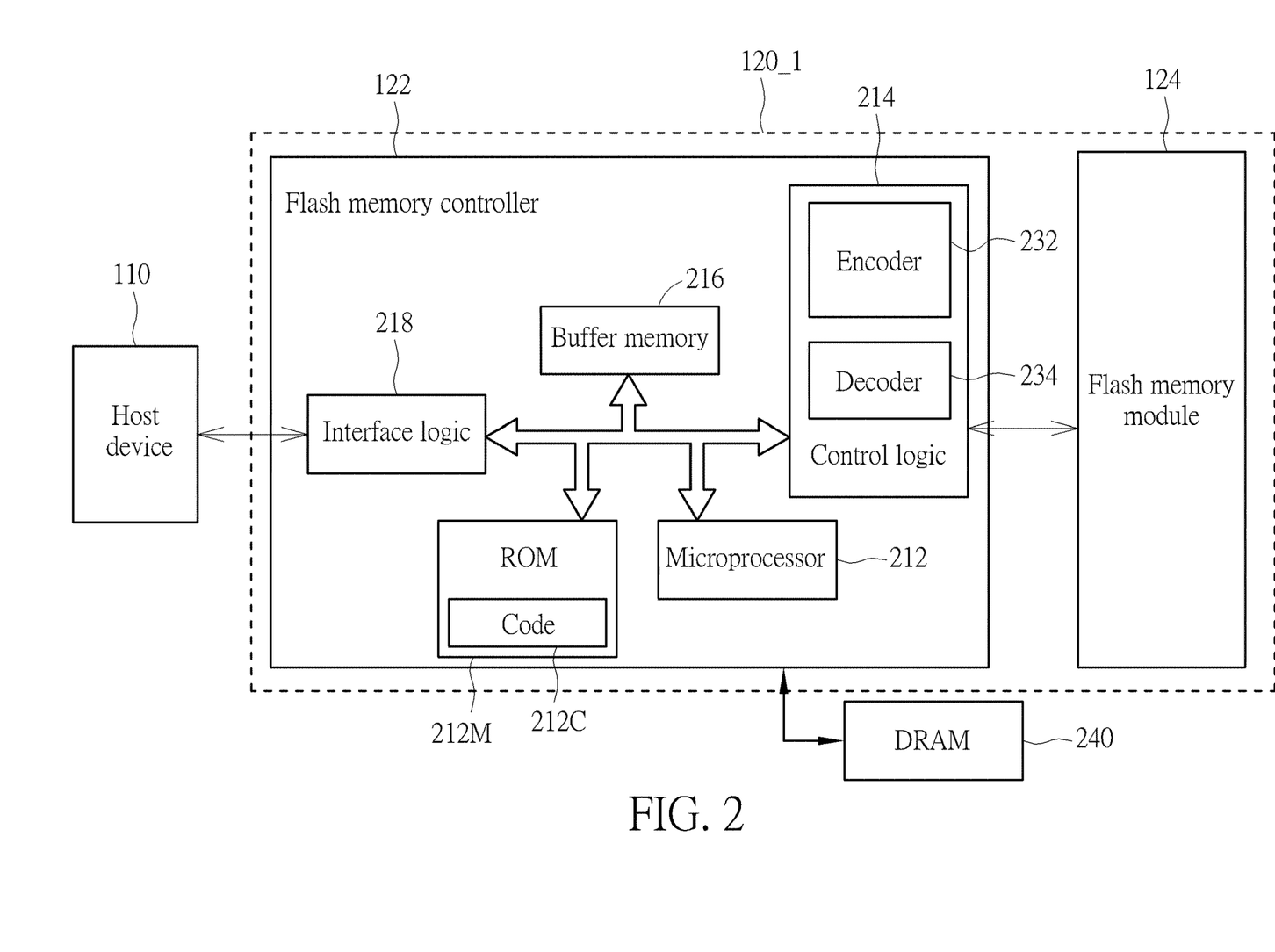
FIG. 2 is a diagram illustrating a flash memory controller in a storage device according to an embodiment of the present invention.

FIG. 2 is a diagram illustrating the storage device 120_1 according to an embodiment of the present invention. As shown in FIG. 2, the flash memory controller 122 comprises a microprocessor 212, a read only memory (ROM) 212M, a control logic 214, a buffer memory 216 and an interface logic 218. The read only memory 212M is configured to store a code 212C, and the microprocessor 212 is configured to execute the code 212C to control access of the flash memory module 124. The control logic 214 includes an encoder 232 and a decoder 234, wherein the encoder 232 is configured to encode data which is written in the flash memory module 124 to generate a corresponding check code (also known as an error correction code (ECC)), and the decoder 234 is configured to decode data read from the flash memory module 124.

In a general situation, the flash memory module 124 includes a plurality of flash memory chips, and each flash memory chip includes a plurality of blocks. The flash memory controller 122 performs a block-based erase operation upon the flash memory module 124. In addition, a block has a specific number of pages, wherein the flash memory controller 122 performs a page-based write operation upon the flash memory module 124. In the present embodiment, the flash memory module 124 is a 3D NAND-type flash memory module.

In practice, through the microprocessor 212 executing the code 212C, the flash memory controller 122 may use its own internal components to perform many control operations. For example, the flash memory controller 122 uses the control logic 214 to control access of the flash memory module 124 (especially access of at least one block or at least one page), uses the buffer memory 216 to perform a required buffering operation, and uses the interface logic 218 to communicate with a host device 110. The buffer memory 216 is implemented by a random access memory (RAM). For example, the buffer memory 216 may be a static RAM (SRAM), but the present invention is not limited thereto. In addition, the flash memory controller 122 is coupled to a dynamic random access memory (DRAM) 240. It should be noticed that a DRAM 240 may also be included in the flash memory controller 122. For example, the DRAM 240 and the flash memory controller 122 may coexist in the same package.

In one embodiment, the storage device 120_1 conforms to the NVMe specification. That is, the interface logic 218 conforms to a specific communication specification such as a peripheral component interconnect (PCI) specification a PCI-Express (PCIe) or specification, and performs communication according to the specific communication specification. For example, the interface logic 218 communicates with the host device 110 via a connector.

Figure 3:
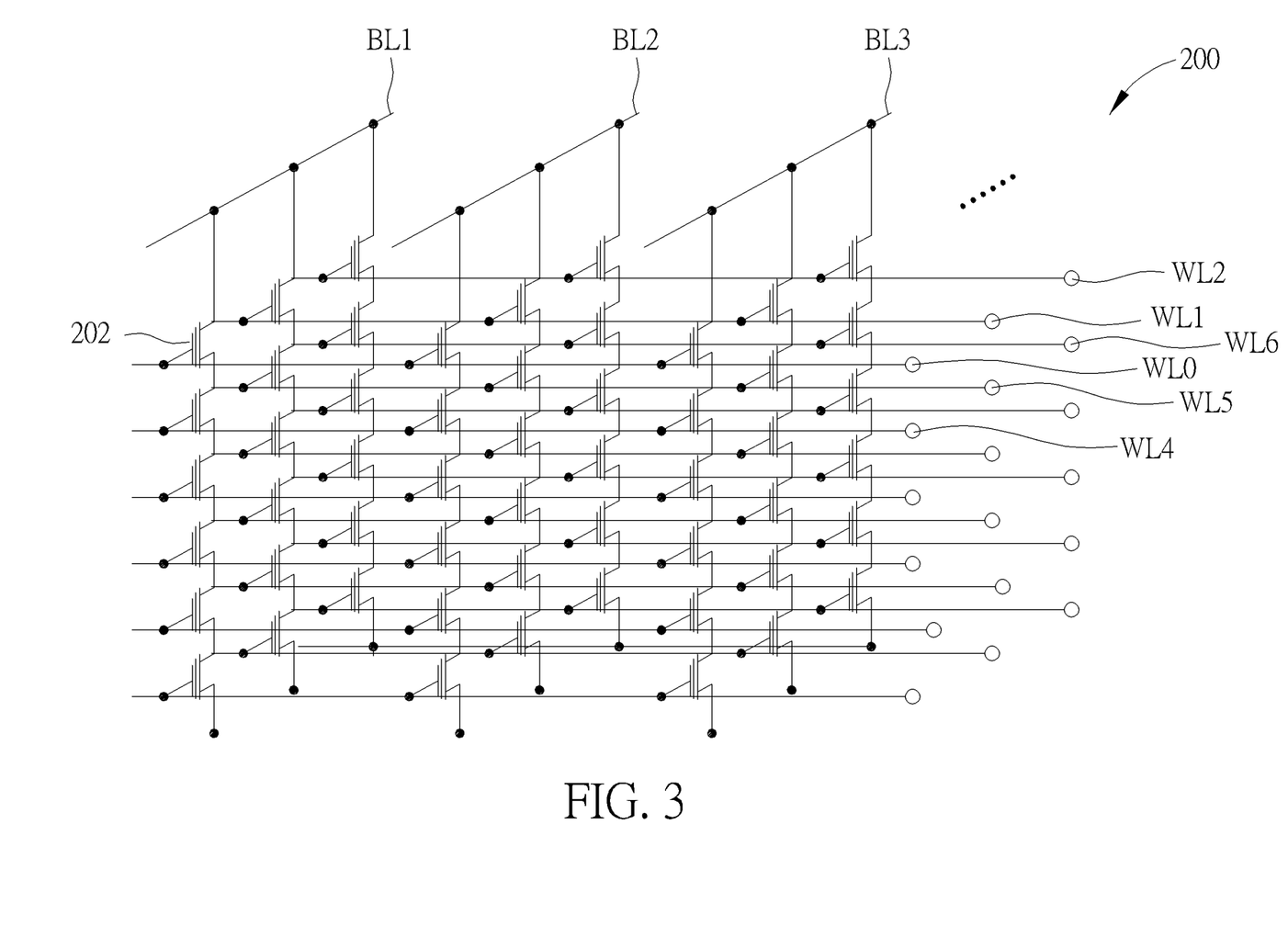
FIG. 3 is a diagram illustrating a block in a flash memory module according to an embodiment of the present invention.

FIG. 3 is a diagram illustrating a block 200 of the flash memory module 124 according to an embodiment of the present invention, wherein the flash memory module 124 is a 3D NAND-type flash memory module. As shown in FIG. 3, the block 200 includes a plurality of memory cells, such as floating gate transistors 202 shown in FIG. 3 or other charge trapping components. A 3D NAND-type flash memory structure is formed through a plurality of bit lines (only BL1-BL3 are shown in FIG. 3) and a plurality of word lines (e.g., WL0-WL2 and WL4-WL6 shown in FIG. 3). Taking a top plane in FIG. 3 as an example, all floating gate transistors on the word line WL0 form at least one page, all floating gate transistors on the word line WL1 form at least another one page, all floating gate transistors on the word line WL2 form at least yet another one page, and so on. In addition, the definition between the word line WL0 and the page (logic page) may vary depending on a writing method of the flash memory. In detail, when data are stored using a single-level cell (SLC) means, all floating gate transistors on the word line WL0 correspond to only one logic page; when data are stored using a multi-level cell (MLC) means, all floating gate transistors on the word line WL0 correspond to two logic pages; when data are stored using a triple-level cell (TLC) means, all floating gate transistors on the word line WL0 correspond to three logic pages; and when data are stored using a quad-level cell (QLC) means, all floating gate transistors on the word line WL0 correspond to four logic pages. The 3D NAND-type flash memory structure and the relationship between word lines and pages are obvious to those skilled in the art. For simplification, no further illustration is provided.

Figure 4:
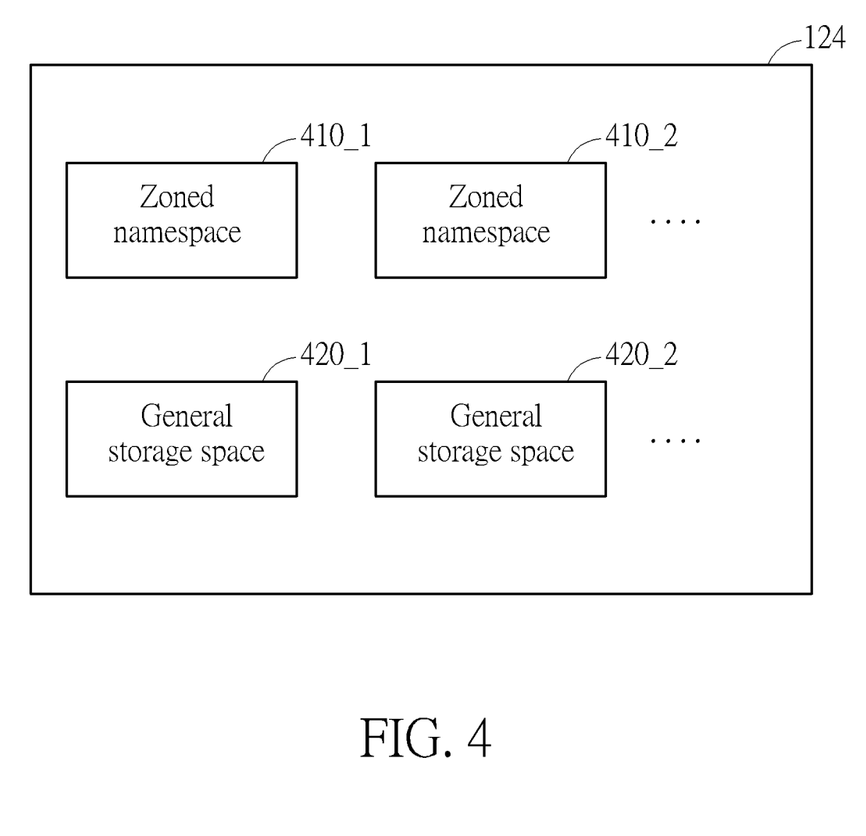
FIG. 4 is a diagram illustrating the flash memory module comprising a general storage space and a zoned namespace.

In the present embodiment, the host device 110 can configure at least a part of the flash memory module 124 as a zoned namespace by sending a settling command set, such as a zoned namespace command set. Referring to FIG. 4, the host device 110 can send a settling command set to the flash memory controller 122, such that the flash memory module 124 has at least one zoned namespace (in the present embodiment, taking the zoned namespaces 410_1 and 410_2 as examples) and at least one general storage space (in this embodiment, taking the general storage spaces 420_1 and 420_2 as examples). The zoned namespace 410_1 is divided into multiple zones for access, and the host device 110 must perform a logical block address (LBA)-based data writing operation in the zoned namespace 410_1. A logical block address (or logical address in brief) can represent one 512-byte data or one 4-kilobyte data, and the host device 110 needs to write data with consecutive logical addresses to a zone. Specifically, referring to FIG. 5, the zoned namespace 410_1 is divided into multiple zones (e.g., zones Z0, Z1, Z2, Z3, etc.), where the size of the zone is set by the host device 110, but the size of each zone is the same. The logical addresses within each zone must be continuous, and there will be no overlapping logical addresses between the zones, that is, one logical address can only exist in one zone. For example, if the size of each zone is "x" logical addresses, and the starting logical address of the zone Z3 is LBA k, then the zone Z3 is used to store data with the logical addresses LBA k, LBA (k+1), LBA (k+2), LBA (k+3), . . . , LBA (k+x−1). In one embodiment, the logical addresses of adjacent zones are also continuous. For example, the zone Z0 is used to store data with logical addresses LBA_1-LBA_2000, the zone Z1 is used to store data with logical addresses LBA_2001-LBA_4000, the zone Z2 is used to store data with logical addresses LBA_4001-LBA_6000, the zone Z3 is used to store data with logical addresses LBA_6001-LBA_8000, and so on. In addition, the amount of data corresponding to a logical address can be determined by the host device 110. For example, the amount of data corresponding to one logical address can be 4 kilobytes (KB).

Figure 5:
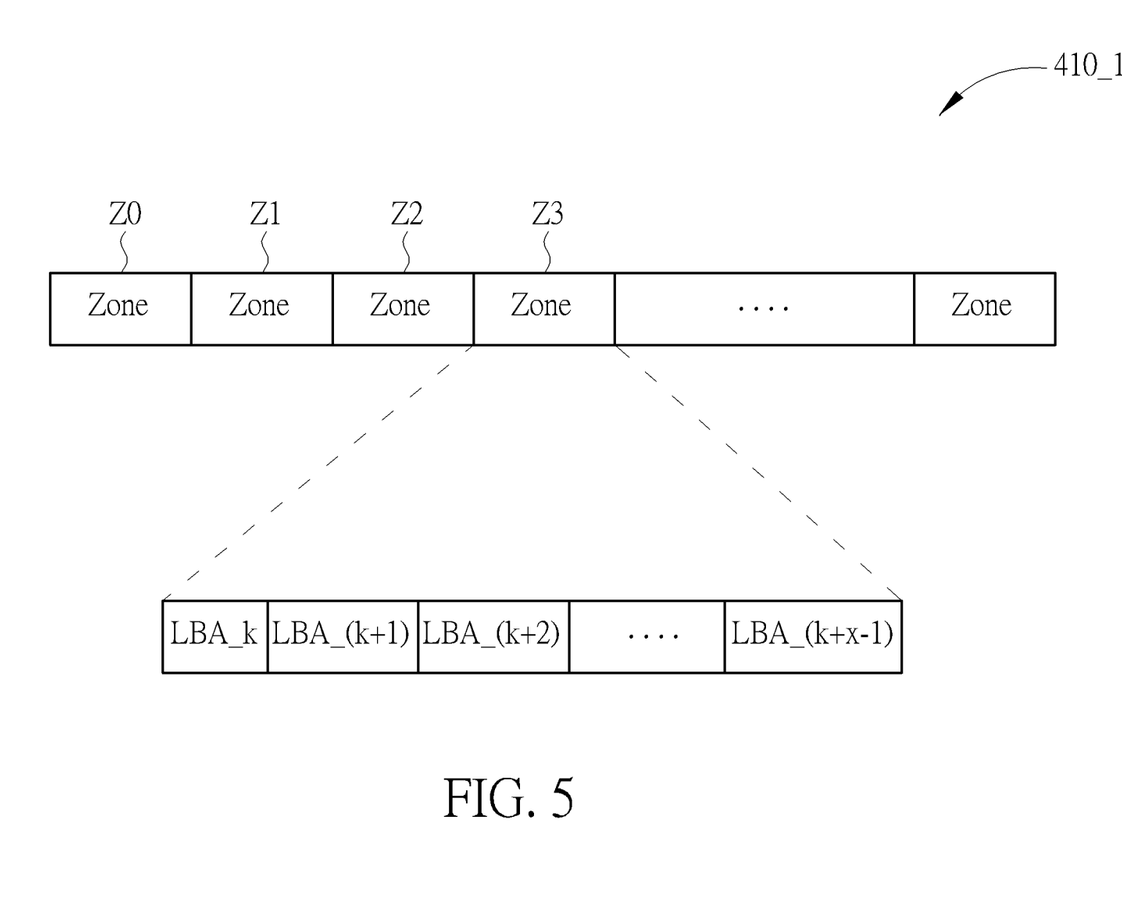
FIG. 5 is a diagram illustrating the zoned namespace divided into multiple zones.

In addition, when being written in each zone, the data is written according to the sequence of the logical addresses of the data. In detail, the flash memory controller 122 sets a write point according to the written data to control the writing sequence of the data. In detail, assuming that the zone Z1 is used to store data with logical addresses LBA_2001-LBA_4000, after the host device 110 transmits the data corresponding to the logical addresses LBA_2001-LBA_2051 to the flash memory controller 122, the flash memory controller 122 sets the write point to the next logical address LBA_2052. If the host device 110 subsequently transmits data belonging to the same zone but does not have the logical address LBA_2052, for example, the host device 110 transmits data with the logical address LBA_3000, the flash memory controller 122 rejects the data writing operation and returns the message of writing failure to the host device 110; in other words, only when the logical address of the received data is the same as the logical address pointed to by the write point, the flash memory controller 122 allows the data writing operation. In addition, if data in multiple zones are written alternately, each zone can have its own write point.

Figure 6:
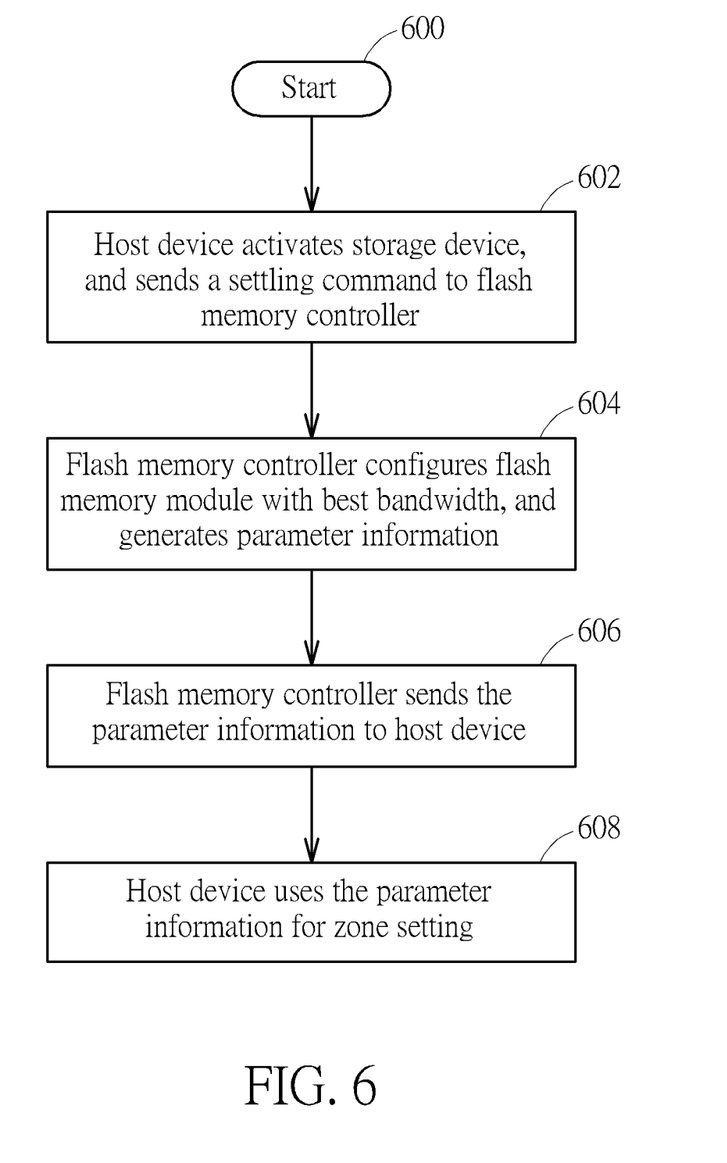
FIG. 6 is a flowchart of an initialization procedure of the storage device according to a first embodiment of the present invention.
Figure 7:
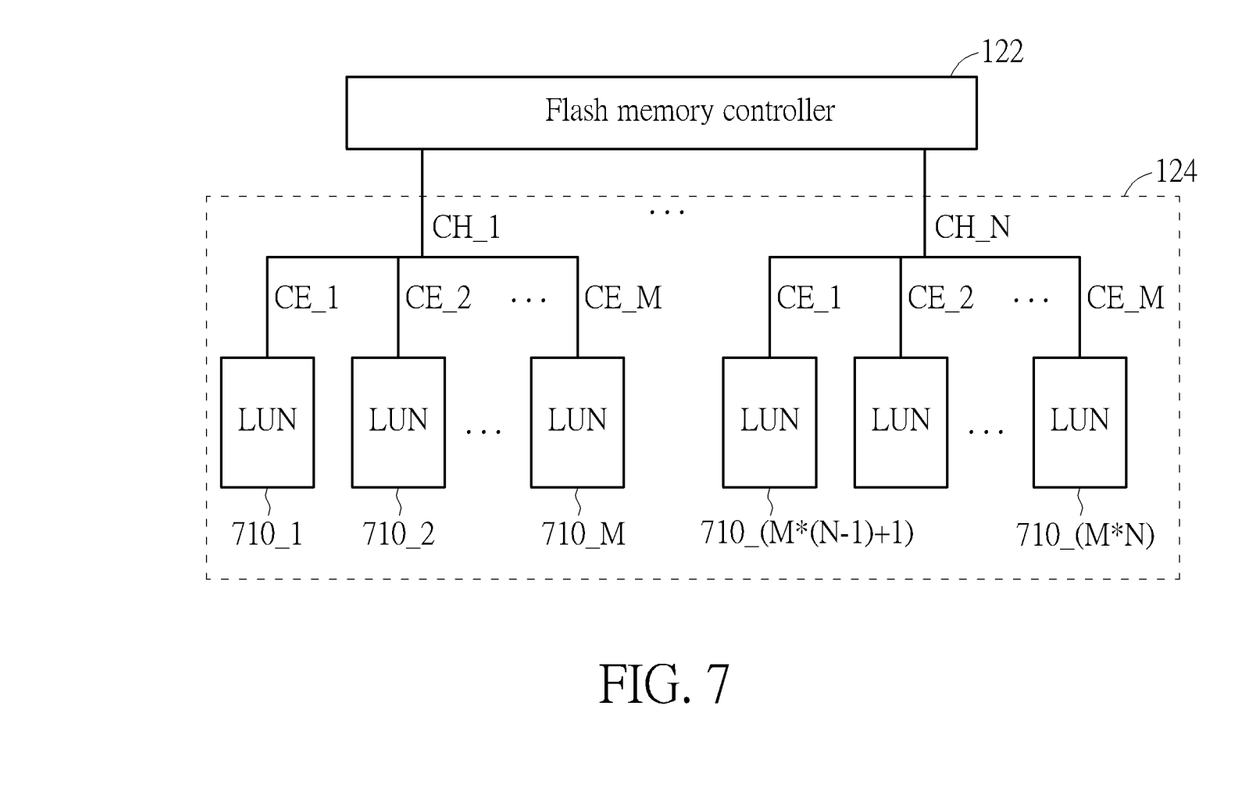
FIG. 7 is a configuration of the storage device according to one embodiment of the present invention.

In order to make the zoned namespace 410_1 and 410_2 work well under the control of the host device 110 and the storage device 120_1, a size of the each zone needs to be properly determined. FIG. 6 is a flowchart of an initialization procedure of the storage device 120_1 according to a first embodiment of the present invention. In Step 600, the flow starts, and the flash memory module 124 has not yet started configuration. In Step 602, the host device 110 starts to activate the storage device 120_1, and the host device 110 sends a settling command set to the flash memory controller 122. In Step 604, the flash memory controller 122 starts to configure the flash memory module 124 based on a best performance or bandwidth setting, to generate parameter information. Specifically, assuming that the flash memory module 124 comprises plurality of channels CH_1-CH_N, and each of the channels CH_1-CH_N correspond to a plurality of logical units (LUN) that are enabled by using chip enable signals CE_1-CE_M. For example, the channel CH_1 corresponds to the LUNs 710_1-710_M that are enabled by using the chip enable signals CE_1-CE_M, and the channel CH_N corresponds to the LUNs 710 (M*(N−1)+1)-**710_(M*N) that are enabled by using the chip enable signals CE_1-CE_M. In this embodiment, the channels CH_1-CH_N can be processed in parallel to access one of the corresponding LUNs simultaneously. For example, when the chip enable signal CE_1 is enabled and the other chip enable signals are disabled, the first LUN of each channel is allowed to be accessed by the host device 110; and when the chip enable signal CE_2 is enabled and the other chip enable signals are disabled, the second LUN of each channel is allowed to be accessed by the host device 110, and so on. In addition, each one of the LUNs can be a die within the flash memory module 124**, or a die may comprise two or more LUNs.

In one embodiment, quantity of the channels and quantity of the chip enable signals can be determined according to designer's consideration, for example, the storage device 120_1 may have sixteen channels and four chip enable signals (i.e., N is equal to "16", and M is equal to "4").

Because the flash memory module 124 supports the plurality of channels CH_1-CH_N, and the plurality of channels CH_1-CH_N can be accessed simultaneously, the flash memory controller 122 can configure the flash memory module 124 based on the number of channels supported by the flash memory module 124.

Figure 8:
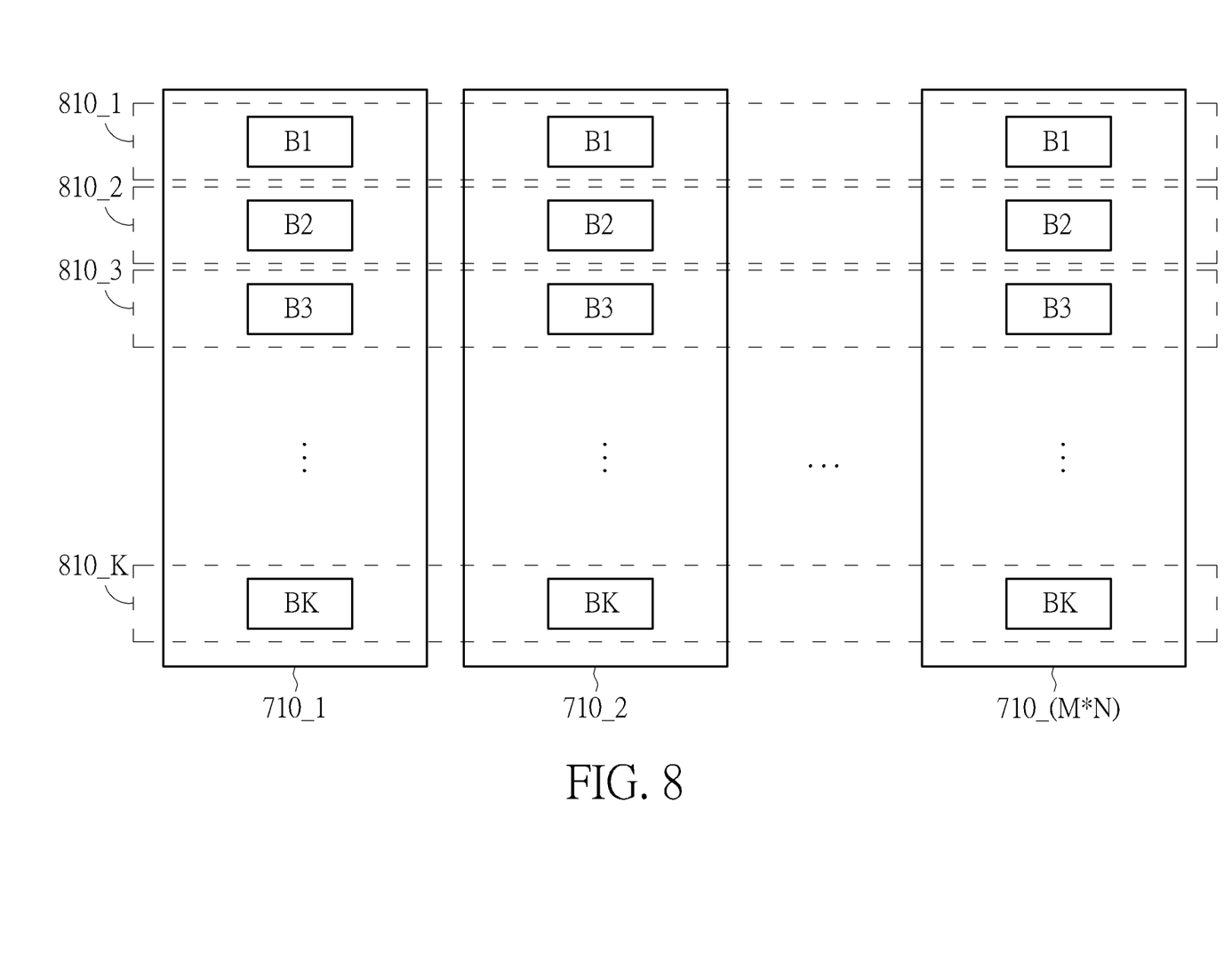
FIG. 8 is a diagram illustrating a super block configuration of the flash memory module according to one embodiment of the present invention.

FIG. 8 is a diagram illustrating a super block configuration of the flash memory module 124 according to one embodiment of the present invention. As shown in FIG. 8, each of the LUNs **710_1-710_(M*N) comprises a plurality of blocks B1-BK. In the process of the super block configuration, the flash memory controller 122 configures blocks B1 of all LUNs 710_1-710_(M*N) as a super block 810_1, configures blocks B2 of all LUNs 710_1-710_(M*N) as a super block 810_2, configures blocks B3 of all LUNs 710_1-710_(M*N) as a super block 810_3, . . . , and configures blocks BK of all LUNs 710_1-710_(M*N) as a super block 810_K. The super block is a logical collection block set by the flash memory controller 122 to facilitate management of the storage device 120_1, and is not a physical collection block. In FIG. 8, the super block 810_1** comprises M*N blocks, and the flash memory controller 122 treats the super block 810_1 as a normal block when accessing the super block 810_1. For example, the super block 810_1 itself is an erasing unit, that is, although the M*N blocks B1 of the super block 810_1 can be erased separately, the flash memory controller 122 must erase the M*N blocks B1 together. In this embodiment, the flash memory controller 122 can temporarily determine the zone whose size is equal to the size of one superblock.

Figure 9:
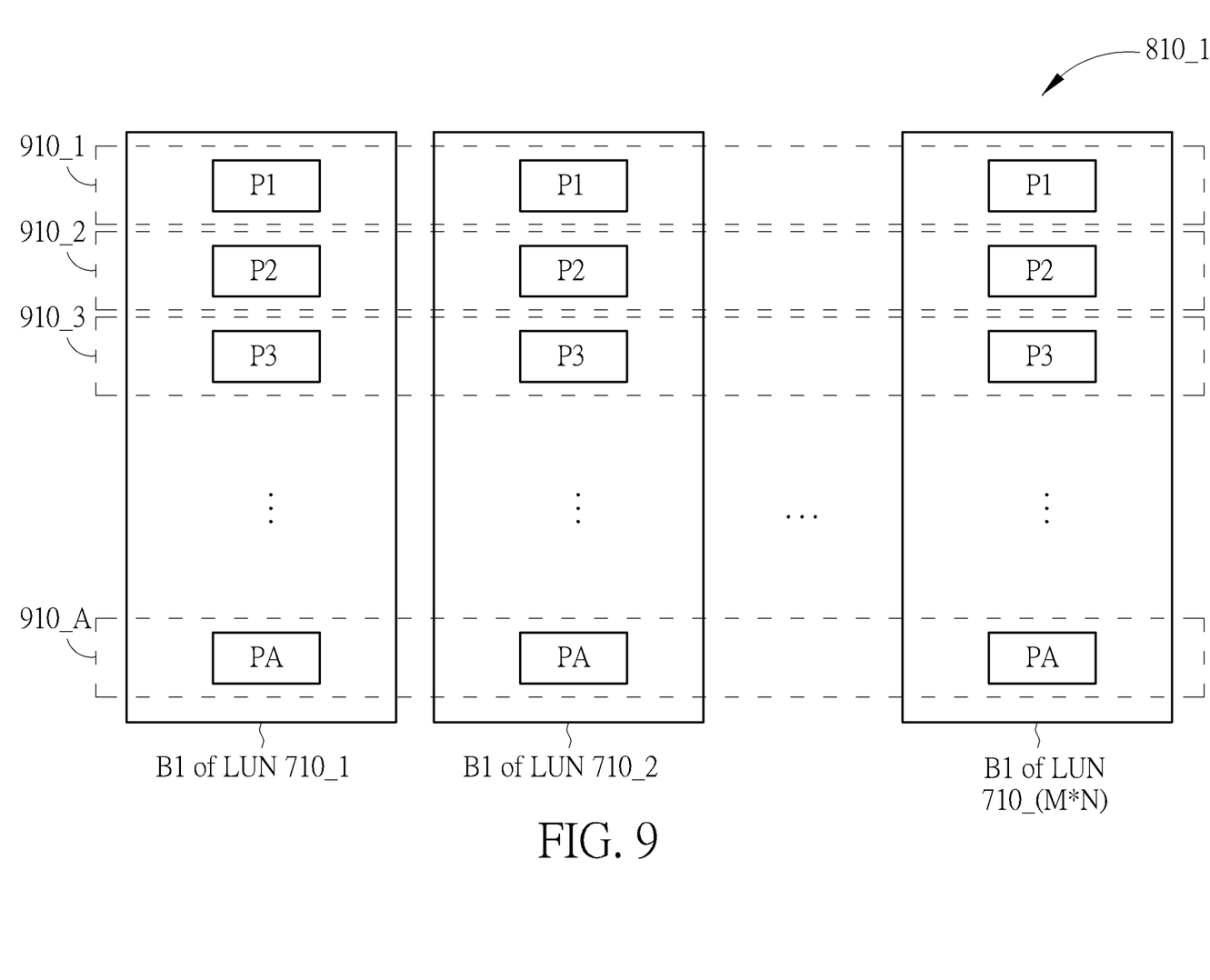
FIG. 9 is a diagram illustrating a super page configuration of the flash memory module according to one embodiment of the present invention.

FIG. 9 is a diagram illustrating a super page configuration of the flash memory module 124 according to one embodiment of the present invention. Taking the super block 810_1 as an example, each of the blocks B1 comprises a plurality of pages P1-PA. In the process of the super page configuration, the flash memory controller 122 configures pages P1 of blocks B1 of all LUNs **710_1-710_(M*N) as a super page 910_1, configures pages P2 of blocks B1 of all LUNs 710_1-710_(M*N) as a super page 910_2, configures pages P3 of blocks B1 of all LUNs 710_1-710_(M*N) as a super page 910_3, . . . , and configures pages PA of blocks B1 of all LUNs 710_1-710_(M*N) as a super page 910A. In addition, regarding the data writing of the super block 810_1, the super pages 910_1-910A are written by the flash memory controller 122 sequentially, in other words, the flash memory controller 122 does not start data writing of the super page 910_2 until data writing of the super page 910_1** is completed.

After the above configurations of the flash memory module 124 are completed, the flash memory controller 122 generates the parameter information, wherein the parameter information comprises a zone size (i.e., a size of one super block), a block size, a page size, a super page size, a number of pages in one block, a number of LUNs corresponding to one super block, a number of zones supported by the flash memory module 124 (i.e., a number of super blocks within the zoned namespace, that is the number "K" in FIG. 8).

In Step 606, the flash memory controller 122 transmits the parameter information to the host device 110.

In Step 608, the host device 110 receives the parameter information from the flash memory controller 122, and uses the parameter information for the setting of the zone. For example, the host device 110 directly uses the zone size (i.e., the size of one super block) provided by the flash memory controller 122 as the subsequent setting when transmitting data of the zone (s).

In the embodiment shown in FIGS. 6-9, by using the flash memory controller 122 to actively detect the number of channels of the flash memory module 124 to determine the zone size with the best performance or bandwidth, and the flash memory controller 122 directly notifies the host device 110 to use this zone size for the subsequent zone setting and data transmission, so that the host device 110 can access the storage device 120_1 with better efficiency and performance.

Figure 10:
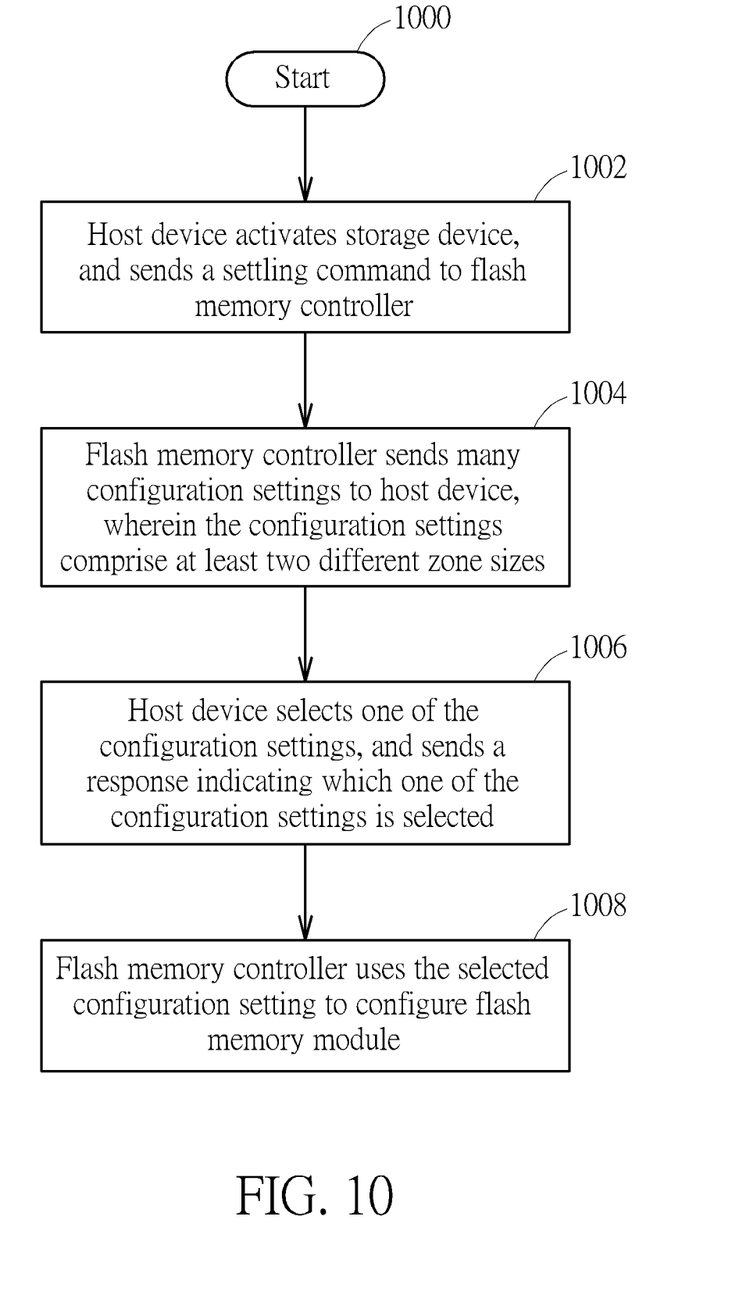
FIG. 10 is a flowchart of an initialization procedure of the storage device according to a second embodiment of the present invention.

FIG. 10 is a flowchart of an initialization procedure of the storage device 120_1 according to a second embodiment of the present invention. In Step 1000, the flow starts, and the flash memory module 124 has not yet started configuration. In Step 1002, the host device 110 starts to activate the storage device 120_1, and the host device 110 sends a settling command set to the flash memory controller 122. In Step 1004, the flash memory controller 122 transmits a plurality of configuration settings to the host device 110, wherein the plurality of configuration settings comprise at least two different zone sizes.

In one embodiment, one of the plurality of configuration settings may be the super block configuration shown in FIG. 8 and the super page configuration shown in FIG. 9, that is, the configuration setting comprises zone size (size of super block) equal to M*N blocks. In addition, the configuration setting may further comprises a block size, a page size, a super page size, a number of pages in one block, a number of LUNs corresponding to one super block, a number of zones supported by the flash memory module 124 (i.e., the number "K" in FIG. 8).

Figure 11:
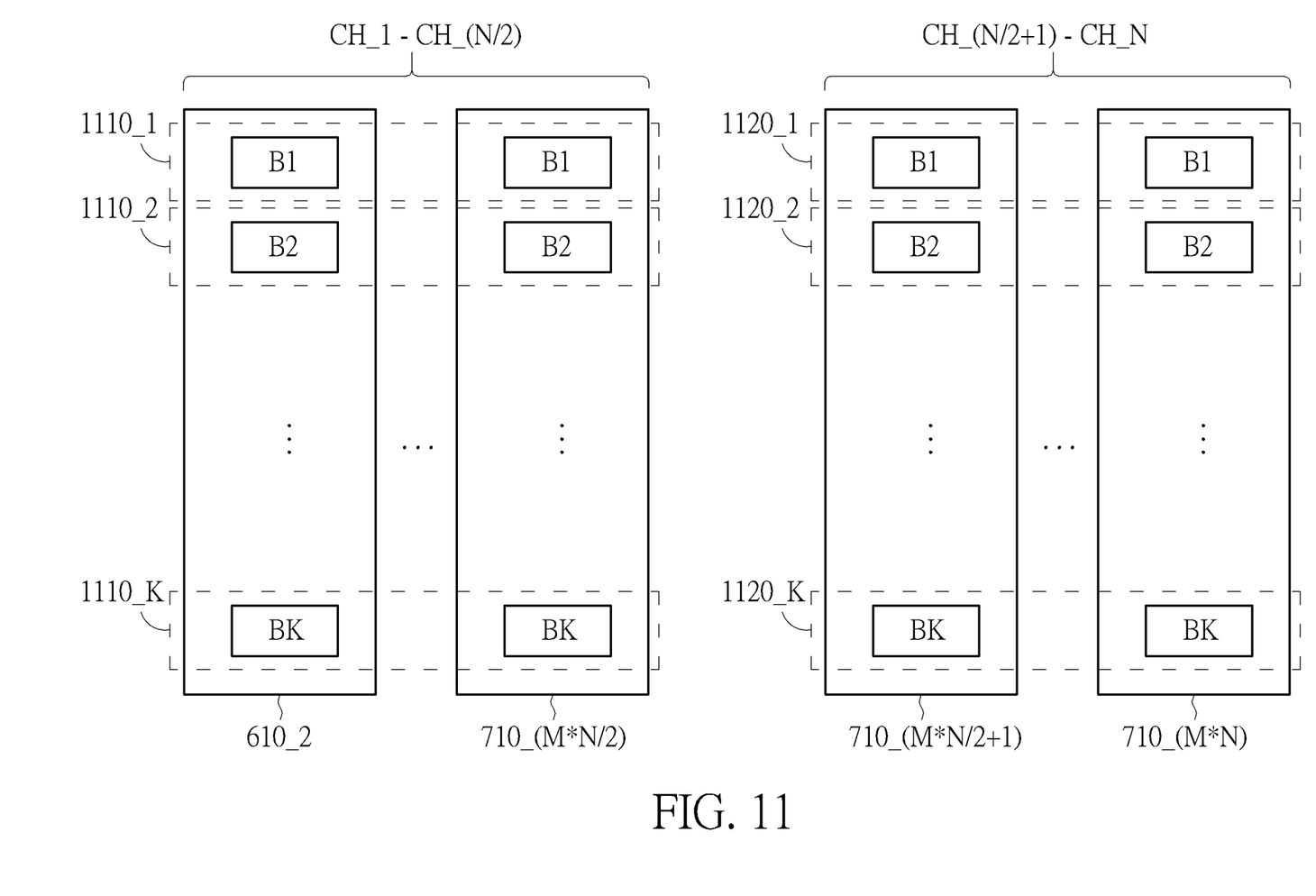
FIG. 11 is a diagram illustrating a super block configuration of the flash memory module according to one embodiment of the present invention.

In one embodiment, the plurality of configuration settings may have a super block configuration that only corresponds to a portion of channels. Taking FIG. 11 as an example, each of the LUNs 710_1-710_(M*N/2) corresponding to the channels CH_1-CH (N/2) comprises a plurality of blocks B1-BK. In the process of the super block configuration, the flash memory controller 122 configures blocks B1 of all LUNs 710_1-710_(M*N/2) as a super block 1110_1, configures blocks B2 of all LUNs 710_1-710_(M*N/2) as a super block 1110_2, configures blocks B3 of all LUNs 710_1-710_(M*N/2) as a super block 1110_3, . . . , and configures blocks BK of all LUNs 710_1-710_(M*N/2) as a super block 1110_K. In addition, each of the LUNs 710_(M*N/2+1)-710_(M*N) corresponding to the channels CH (N/2+1)-CH_(N) comprises a plurality of blocks B1-BK, and the flash memory controller 122 configures blocks B1 of all LUNs 710_(M*N/2+1)-710_(M*N) as a super block 1210_1, configures blocks B2 of all LUNs 710_(M*N/2+1)-710_(M*N) as a super block 1210_2, configures blocks B3 of all LUNs 710_(M*N/2+1)-710_(M*N) as a super block 1210_3, . . . , and configures blocks BK of all LUNs 710_(M*N/2+1)-710_(M*N) as a super block 1210_K. In FIG. 11, the super block 1110_1 comprises M*N/2 blocks, and the flash memory controller 122 treats the super block 1110_1 as a normal block when accessing the super block 1110_1. For example, the super block 1110_1 itself is an erasing unit, that is, although the M*N/2 blocks B1 of the super block 1110_1 can be erased separately, the flash memory controller 122 must erase the M*N/2 blocks B1 together. In this embodiment, the flash memory controller 122 can temporarily determine the zone whose size is equal to the size of one superblock.

Figure 12:
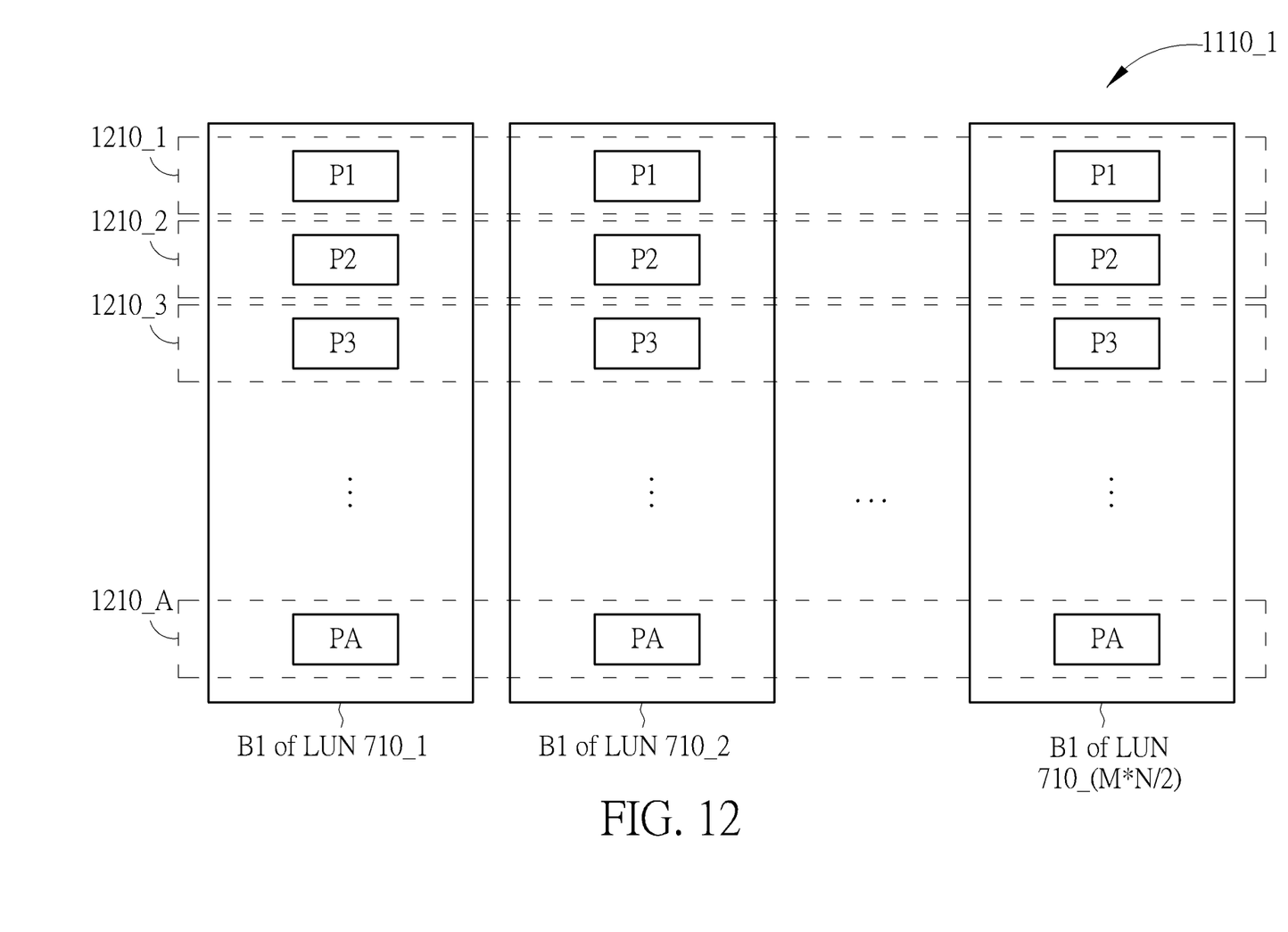
FIG. 12 is a diagram illustrating a super page configuration of the flash memory module according to one embodiment of the present invention.

FIG. 12 is a diagram illustrating a super page configuration of the flash memory module 124 according to one embodiment of the present invention. Taking the super block 1110_1 as an example, each of the blocks B1 comprises a plurality of pages P1-PA. In the process of the super page configuration, the flash memory controller 122 configures pages P1 of blocks B1 of all LUNs 710_1-710_(M*N/2) as a super page 1210_1, configures pages P2 of blocks B1 of all LUNs 710_1-710_(M*N/1) as a super page 1210_2, configures pages P3 of blocks B1 of all LUNs 710_1-710_(M*N/2) as a super page 1210_3, . . . , and configures pages PA of blocks B1 of all LUNs 710_1-710_(M*N/2) as a super page 1210_A. In addition, regarding the data writing of the super block 1110_1, the super pages 1210_1-1210_A are written by the flash memory controller 122 sequentially, in other words, the flash memory controller 122 does not start data writing of the super page 1210_2 until data writing of the super page 1210_1 is completed.

In this embodiment, one of the plurality of configuration settings may be the super block configuration shown in FIG. 10 and the super page configuration shown in FIG. 11, that is, the configuration setting comprises zone size (size of super block) equal to M*N/2 blocks. In addition, the configuration setting may further comprises a block size, a page size, a super page size, a number of pages in one block, a number of LUNs corresponding to one super block, a number of zones supported by the flash memory module 124 (i.e., "2K", wherein "K" is the number shown in FIG. 8).

In other embodiments, the plurality of configuration settings may have a super block configuration that corresponds to different number of channels. For example, each super block may comprises blocks of two or three channels, that is the zone size may be equal to 2*M blocks or 3*M blocks.

In Step 1006, after receiving the configuration settings from the flash memory controller 122, the host device 110 selects one of the configuration settings according to its application. For example, if the host device 110 generally writes data with continuous logical addresses into the storage device 120_1, the host device 110 may select the configuration setting with higher bandwidth such as the embodiments shown in FIG. 8 and FIG. 9; and if the host device 110 generally writes random data into the storage device 120_1, the host device 110 may select the configuration setting with smaller zone size such as the embodiments shown in FIG. 11 and FIG. 12. Then, the host device 110 sends a response indicating which one of the configuration settings is selected to the flash memory controller 122.

In Step 1008, the flash memory controller 122 receives the response from the host device 110, and uses the selected configuration setting to start to configure the flash memory module 124. For example, if the host device 110 selects the above configuration setting whose zone size is equal to M*N blocks, the flash memory controller 122 may configure the flash memory module 124 as the embodiments shown in FIG. 8 and FIG. 9. If the host device 110 selects the above configuration setting whose zone size is equal to M*N/2 blocks, the flash memory controller 122 may configure the flash memory module 124 as the embodiments shown in FIG. 11 and FIG. 12.

In the embodiment shown in FIGS. 10-12, by using the flash memory controller 122 to provide a plurality of configuration settings, the host device 110 can select the most suitable configuration setting based on its application, for the flash memory controller 122 to perform the super block configuration and super page configuration. Therefore, the host device 110 can access the storage device 120_1 with better efficiency and performance.

Figure 13:
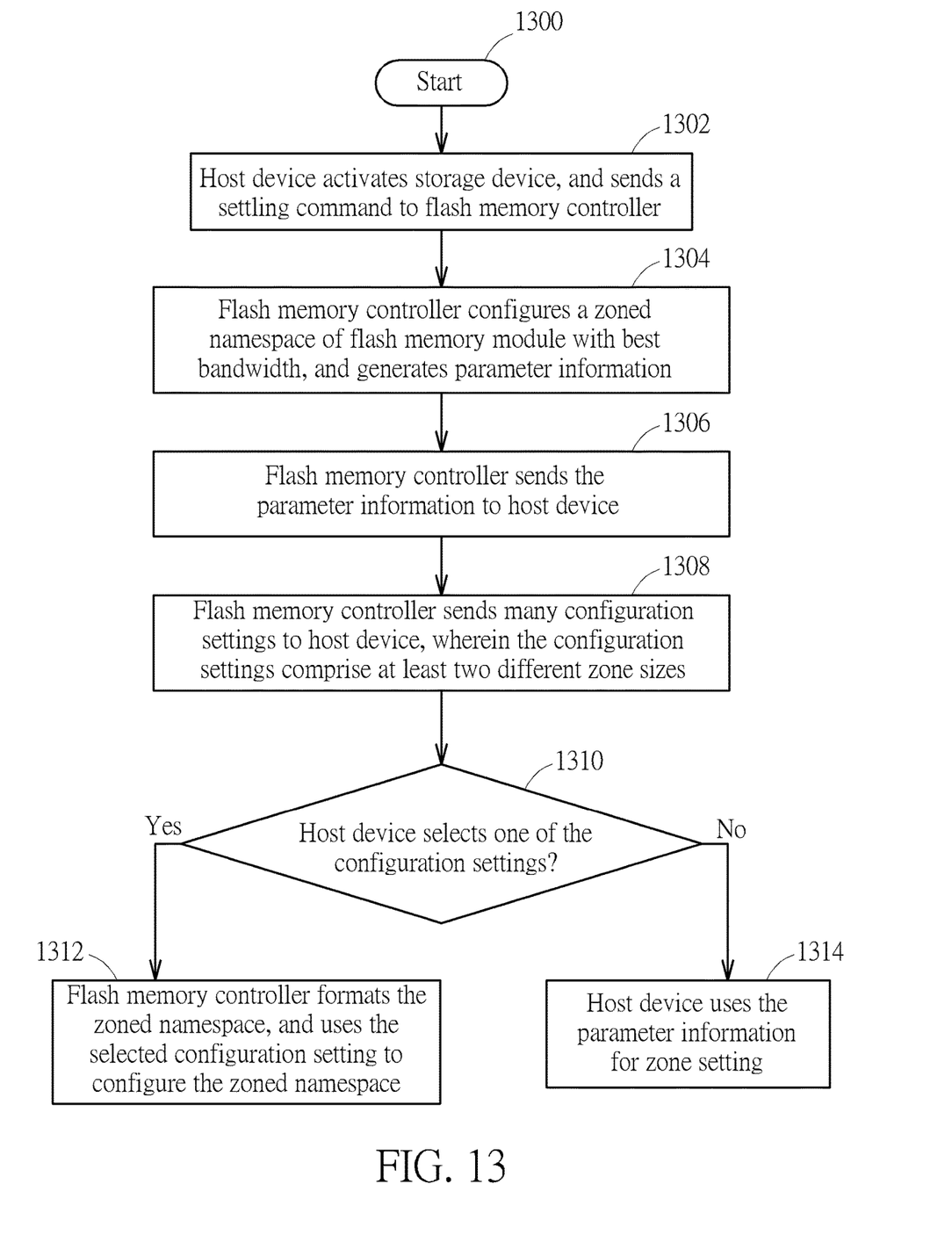
FIG. 13 is a flowchart of an initialization procedure of the storage device according to a third embodiment of the present invention.

FIG. 13 is a flowchart of an initialization procedure of the storage device 120_1 according to a third embodiment of the present invention. In Step 1300, the flow starts, and the flash memory module 124 has not yet started configuration. In Step 1302, the host device 110 starts to activate the storage device 120_1, and the host device 110 sends a settling command set to the flash memory controller 122. In Step 1304, the flash memory controller 122 starts to configure the flash memory module 124 based on a best performance or bandwidth setting, to generate parameter information. For example, the flash memory controller 122 configures the flash memory module 124 as the embodiments shown in FIG. 8 and FIG. 9. After the above configurations of the flash memory module 124 are completed, the flash memory controller 122 generates the parameter information, wherein the parameter information comprises a zone size (i.e., a size of one super block), a block size, a page size, a super page size, a number of pages in one block, a number of LUNs corresponding to one super block, a number of zones supported by the flash memory module 124 (i.e., the number "K" in FIG. 8).

In Step 1306, the flash memory controller 122 transmits the parameter information to the host device 110.

In Step 1308, the flash memory controller 122 transmits a plurality of configuration settings to the host device 110, wherein the plurality of configuration settings comprise at least two different zone sizes. The contents of plurality of configuration settings can refer to the above embodiment show in FIG. 10.

In Step 1310, the host device 110 determines if directly using the parameter information or selecting one configuration settings whose zone size is different from the parameter information. If the host device 110 selects one of configuration settings, the flow enters Step 1312; otherwise, the flow enters Step 1314.

In Step 1312, the host device 110 sends a response indicating which one of the configuration settings is selected to the flash memory controller 122, and the flash memory controller 112 formats the zoned namespace such as 410_1, and uses the selected configuration setting to configure the zoned namespace of the flash memory module 124. For example, the super block configuration shown in FIG. 8 is formatted, and a new super block configuration shown in FIG. 11 is performed.

In Step 1314, the host device 110 receives the parameter information from the flash memory controller 122, and uses the parameter information for the setting of the zone. For example, the host device 110 directly uses the zone size (i.e., the size of one super block) provided by the flash memory controller 122 as the subsequent setting when transmitting data of the zone (s).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a flash memory controller, wherein the flash memory controller is configured to access a flash memory module, the flash memory module comprises a plurality of blocks, and the control method comprising:
   receiving a settling command from a host device;
   in response to the settling command, configuring at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones;
   generating parameter information according to a configuration of the zoned namespace;
   transmitting the parameter information to the host device, for the host device uses the parameter information to set the zone;
   transmitting a plurality of configuration settings to the host device;
   receiving a response indicating which one of the configuration settings is selected;
   if the selected configuration setting is different from a current configuration of the zoned namespace, formatting the zoned namespace; and
   using the selected configuration setting to configure the zoned namespace.

2. The control method of claim 1, wherein the parameter information comprises a zone size of each zone.

3. The control method of claim 2, wherein the step of configuring at least one portion of the flash memory module as the zoned namespace comprises:
   configuring the zoned namespace to have a plurality of super blocks, wherein each of the plurality of super block comprises a plurality of blocks respectively located in different logical units (LUN); and
   determining the zone size equal to a size of each super block.

4. The control method of claim 3, wherein the flash memory controller is configured to access the flash memory module via a plurality of channels, and each of the plurality of channels correspond to a plurality of LUNs that are enabled by using a plurality of chip enable signals, respectively; and the each of the plurality of super block comprises the plurality of blocks respectively located in all of the LUNs.

5. The control method of claim 1, wherein the plurality of configuration settings have at least two different zone sizes.

6. A flash memory controller, wherein the flash memory controller is configured to access a flash memory module, the flash memory module comprises a plurality of blocks, and the flash memory controller comprising:
   a read only memory, configured to store a code;
   a microprocessor, configured to execute the code for controlling access of the flash memory module; and
   wherein the microprocessor is configured to perform the steps of:
   receiving a settling command from a host device;
   in response to the settling command, configuring at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones;
   generating parameter information according to a configuration of the zoned namespace;
   transmitting the parameter information to the host device, for the host device uses the parameter information to set the zone;
   transmitting a plurality of configuration settings to the host device;
   receiving a response indicating which one of the configuration settings is selected;
   if the selected configuration setting is different from a current configuration of the zoned namespace, formatting the zoned namespace; and
   using the selected configuration setting to configure the zoned namespace.

7. The flash memory controller of claim 6, wherein the parameter information comprises a zone size of each zone.

8. The flash memory controller of claim 7, wherein the step of configuring at least one portion of the flash memory module as the zoned namespace comprises:
   configuring the zoned namespace to have a plurality of super blocks, wherein each of the plurality of super block comprises a plurality of blocks respectively located in different logical units (LUN); and
   determining the zone size equal to a size of each super block.

9. The flash memory controller of claim 8, wherein the flash memory controller is configured to access the flash memory module via a plurality of channels, and each of the plurality of channels correspond to a plurality of LUNs that are enabled by using a plurality of chip enable signals, respectively; and the each of the plurality of super block comprises the plurality of blocks respectively located in all of the LUNs.

10. The flash memory controller of claim 6, wherein the plurality of configuration settings have at least two different zone sizes.

11. A storage device, comprising:
    a flash memory module, wherein the flash memory module comprises a plurality of blocks; and
    a flash memory controller, configured to access the flash memory module;
    wherein the flash memory controller is configured to perform the steps of:
    receiving a settling command from a host device;
    in response to the settling command, configuring at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones;
    generating parameter information according to a configuration of the zoned namespace;
    transmitting the parameter information to the host device, for the host device uses the parameter information to set the zone;
    transmitting a plurality of configuration settings to the host device;
    receiving a response indicating which one of the configuration settings is selected;
    if the selected configuration setting is different from a current configuration of the zoned namespace, formatting the zoned namespace; and
    using the selected configuration setting to configure the zoned namespace.

12. The storage device of claim 11, wherein the parameter information comprises a zone size of each zone.

13. The storage device of claim 12, wherein the step of configuring at least one portion of the flash memory module as the zoned namespace comprises:
    configuring the zoned namespace to have a plurality of super blocks, wherein each of the plurality of super block comprises a plurality of blocks respectively located in different logical units (LUN); and
    determining the zone size equal to a size of each super block.

14. The storage device of claim 13, wherein the flash memory controller is configured to access the flash memory module via a plurality of channels, and each of the plurality of channels correspond to a plurality of LUNs that are enabled by using a plurality of chip enable signals, respectively; and the each of the plurality of super block comprises the plurality of blocks respectively located in all of the LUNs.

15. The storage device of claim 11, wherein the plurality of configuration settings have at least two different zone sizes.

* * * * *